3,808,337
TREATMENT OF DISEASES OF THE CENTRAL NERVOUS SYSTEM WITH 3,4,5-TRIMETHOXY-BENZAMIDO-BUTYRIC ACID
William Ferrari, Modena, Italy, assignor to Instituto Chemioterapico Italiano S.p.A., Milan, Italy
No Drawing. Filed June 29, 1972, Ser. No. 267,613
Int. Cl. A61k 27/00
U.S. Cl. 424—319   4 Claims

ABSTRACT OF THE DISCLOSURE

The treatment of certain diseases of the central nervous system with 3,4,5-trimethoxybenzamido-butyric acid and pharmaceutically-acceptable salts thereof is disclosed.

---

The present invention relates to a method of depressing the activity of the central nervous system of a living animal body and, more particularly, relates to a method of treating all types of Parkinsonism and other disorders of the central nervous system which respond to anticholinergic agents, with 3,4,5-trimethoxybenzamido-butyric acid or pharmaceutically-acceptable salts thereof.

Agents with anticholinergic activity act on the central nervous system of living animals by depressing the activity of acetylcholine. Such agents are useful in treating symptoms of disorders of the central nervous system in living animals such as spasm of the type induced by acetylcholine, for example, various kinds of epilepsy, Parkinsonism, and the like. The degree of utilization of anticholinergic agents is restricted by the undesirable side-effects which they may concurrently produce. It is, therefore, highly desirable that an agent having anticholinergic activity affect the central nervous system without undue influence on the peripheral nervous system.

Employment of anticholinergic agents for the treatment of Parkinsonism is of particular interest. Parkinsonism is a condition involving disturbance of certain brain centers, such as the mesodiencephalic activating center of the brain stem, which causes muscular rigidity (catatonia) and may impair normal movements and the ability to speak and write. It results from injury to basal ganglia and is frequently the sequel to virus-caused epidemic (lethargic) encephalitis. Symptoms include involuntary tremors, lack of facial expression, depressed emotional tone, and salivation. Compounds which control the symptoms of Parkinsonism are, in general, anticholinergic agents which are capable of passing the blood brain barrier. Atropine and extract from various species of Solanaceae have long been used in treating Parkinsonism, and, more recently, anticholinergic agents, such as trihexylphenidyl, procyclidine, ethopropazine, and diethazine have been so employed. These anticholinergic agents have met with limited success due to undesirable side-effects which may result from their administration. Dryness of the mouth, blurred vision, mydriasis (enlargement of pupils), epigastric distress, nausea and constipation are examples of side-effects which may be caused by anticholinergic agents. The capacity to produce desired anticholinergic effects without side-effects is a practical consideration in the evaluation of an agent employed in the treatment of disorders of the central nervous system.

The method of the present invention resides in the finding that the administration of 3,4,5-trimethoxybenzamidobutyric acid, preferably γ-(3,4,5-trimethoxybenzamido)-butyric acid, which corresponds to the formula

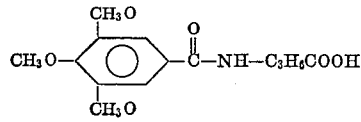

and/or its pharmaceutically acceptable salts, is effective in treating disorders of the central nervous system of living animals which respond to anticholinergic agents. Preferably, the therapeutically-acceptable salts of the compounds of the present invention are water-soluble neutral salts and are preferably the sodium and potassium salts. Other suitable salts are, for example, the ammonium, magnesium or calcium salts of the free acid. Advantageously, the compounds of the present invention can be used to treat the symptoms of Parkinsonism and the like in man and lower mammals. Little, if any, undesirable side effects are observed when employing the method of this invention.

The compounds can be prepared by reacting 3,4,5-trimethoxybenzoyl chloride with aminobutyric acid at a temperature of about —5 to +5° C. The free amino acid is slurried in water and is neutralized with a hydroxyl-containing solution, e.g., sodium hydroxide solution. The mixture is chilled to within —5° C. to +5° C., and 3,4,5-trimethoxybenzoyl chloride is gradually added together with agitation, maintaining the temperature at below +5° C. The mole ratio of amino acid to the acid chloride is generally about 1 to 1.5:1. The resulting solution is preferably treated with char to decolorize it; the char is separated, e.g., filtered; and the filtrate neutralized with dilute HCl or $H_2SO_4$ to about a Congo red indicator end-point. The resulting precipitate is separated, e.g., by filtration or centrifugation, washed with water, dried, then recrystallized from ethanol, separated by filtration, centrifugation or decantation and dried. The 3,4,5-trimethoxybenzoyl chloride is commercially available. The aminobutyric acid can be prepared by known methods, for example, by the HCl-catalyzed hydrolysis of the corresponding lactam, which is known in the art. The salts obtained by the hydrolysis can then be passed through an ion-exchange resin bed to obtain the free amino acid.

The pharmaceutically-acceptable salts of the free acid compound of the method of the present invention can be obtained in any convenient manner. For example, the free acid may be converted into the salts by reaction of the free acid with an appropriate base in the presence of an inert solvent. Appropriate bases to prepare the salt form of the compound are, for example, sodium hydroxide, potassium hydroxide, ammonium hydroxide, magnesium hydroxide, and calcium hydroxide. The compounds employed in the method of the present invention are also described in United States patent application S.N. 50,949, filed June 29, 1970, now U.S. Pat. No. 3,697,563, in the name of Aldo Garzia.

In the method of treatment of disorders of the central nervous system which respond to anti-cholinergic agents, particularly Parkinsonism, in accordance with the present invention, the dosage of, for instance, γ-(3,4,5-trimethoxybenzamido)-butyric acid, which can be given, can vary widely within rather broad limits. The dosages generally range from about at least 1 mg./kg./day (milligrams per kilograms of body weight per day), preferably 1 to 500 mg./kg./day, more preferably 2 to 200 mg./kg./day, based on the free acid. Particularly beneficial results have been obtained using an amount in a range of about 2 to 100 mg./kg./day, based upon the free acid. The treatment can consist of a single daily dose, or the above dosages can be given fractionally at periodic intervals, for example, two to four doses of about 5 to 50 mg./kg. can be administered per day.

Administration of 3,4,5 - trimethoxybenzamido-butyric acid in accordance with the method of this invention can be oral or parenteral. When the compound utilized in the present invention is administered by parenteral injection, e.g., subcutaneous, percutaneous, intraperitoneal, intravenous, intraarterial, intracutaneous, intramuscular, or interarticular injection, it is preferably in the form of the corresponding water-soluble neutral salt, preferably the sodium salt.

In connection with oral administration, the compound is preferably administered as free acid but it can also be in the form of a pharmaceutically-acceptable salt, e.g., as the ammonium, sodium, potassium, magnesium or calcium salt. For oral administration, the active γ - (3,4,5-trimethoxybenzamido)-butyric acid and a nontoxic pharmaceutical carrier may, for example, take the form of a pill, lozenge, tablet capsule, or a liquid suspension. Exemplary carriers are solids, such as lactose, magnesium stearate, calcium stearate, starch, terra alba, dicalcium phosphate, sucrose, talc, stearic acid, gelatin, agar, pectin, or acacia and liquids such as peanut oil, sesame oil, olive oil, water or the like.

According to one suitable method, the free acid can be administered mixed with a molar equivalent of sodium or potassium bicarbonate. Suitable tablets for human or animal use can be conveniently prepared generally containing from about 5 to 500 mg. of 3,4,5 - trimethoxybenzamido-butyric acid, either as free acid or as a pharmaceutically-acceptable salt thereof. The compounds of the present invention are usually administered in preparations containing about 0.01 to 75%, by weight, of 3,4,5-trimethoxybenzamido-butyric acid. For parenteral administration, a composition containing 3,4,5-trimethoxybenzamido-butyric acid may be in the form of a sterile solution. Suitable preparations for parenteral injection provide from about 5 to 500 mg. of 3,4,5-trimethoxy-benzamido-butyric acid. In addition, the compound used in the method of the present invention, or compositions containing the same, may be either administered together with or include other physiologically active materials and/or medicaments, e.g., buffering agents, antacids, sedatives, tranquilizers, analgesics, or the like.

It will be understood that the compositions employed in the method of the present invention can be brought into a unit dosage form by any suitable technique known to one skilled in the art.

Desirably, a method of treatment of Parkinsonism minimizes as far as possible peripheral anticholinergic (e.g., antispasmodic) activity. One means of determining the possible peripheral effects of a composition employed in treating, for instance, Parkinsonism is by observing its effect upon acetylcholine produced spasm of an isolated ileum. γ - 3,4,5 - trimethoxybenzamido-butyric acid does not oppose the effect of acetylcholine on an isolated ileum of a guinea pig, even at dosages of 1000 mg./kg. Other methods for determining possible peripheral effects are by observing the response in an animal after injection of acetylcholine and by observing the response of an animal to stimulation of the peripheral stump of the vagal nerve after treatment with the composition. In rats, γ-(3,4,5 - trimethoxybenzamido) - butyric acid does not alter the hypotensive and bradycardial effect of acetylcholine which is intravenously administered or the effect of the stimulation of the peripheral stump of the vagal nerve.

A clinically useful substance for the treatment of Parkinsonism generally inhibits tremors which are produced in mice, rats, guinea pigs, and other laboratory animals that have undergone treatment with tremorine. Tremorine serves as an acetylcholinemimetic for the neurons of the central nervous system. The higher order of activity of 3,4,5 - trimethoxybenzamido - butyric acid and its low order of toxicity, as evidenced by tests in lower animals (representative of which are reported hereinafter), are indicative of utility in treating disorders of the central nervous system, such as Parkinsonism, in human beings as well as in lower animals.

γ - (3,4,5 - trimethoxybenzamido) - butyric acid is evaluated for its effectiveness against tremors produced in guinea pigs by 1,4 - dipyrrolidino - 2 - butyne (tremorine) utilizing a procedure which has been modified from that described by G. M. Everett et al., Science 124, 79 (1956), a standard procedure for antitremorine screen. In all the Examples, the amount of the sodium salt of γ - (3,4,5 - trimethoxybenzamido)-butyric acid administered is based on the free acid.

EXAMPLE I

Mice of either sex are used and at least six mice are used for each dosage level. Each animal is given a challenging dose of tremorine, 20 milligrams per kilogram, intraperitoneally one hour after administration of the sodium salt of γ - (3,4,5 - trimethoxybenzamido)-butyric acid. The animals are then observed for signs of central and peripheral effects of tremorine. γ-(3,4,5-trimethoxybenzamido)-butyric acid is employed for screening by administering various sized dosages intraperitoneally into the animals. Table I gives a summary of the effectiveness of the treating agent with respect to tremors, motility, and vagal symptoms in the animals produced by the administration of tremorine:

TABLE I

| Amount of γ-(3,4,5-trimethoxy-benzamido)-butyric acid administered (mg./kg.) | Number of animals | Tremorine (mg./kg.) | Tremors Complete | Tremors Partial | Motility symptoms Complete | Motility symptoms Partial | Vagal symptoms Complete | Vagal symptoms Partial |
|---|---|---|---|---|---|---|---|---|
| 3 | 6 | 20 | 0 | 0 | 0 | 0 | 0 | 0 |
| 10 | 6 | 20 | 3 | 3 | 3 | 0 | 0 | 6 |
| 50 | 6 | 20 | 3 | 3 | 4 | 2 | 0 | 6 |
| 100 | 6 | 20 | 3 | 0 | 0 | 6 | 0 | 6 |
| 200 | 6 | 20 | 2 | 0 | 0 | 0 | 0 | 0 |
| 400 | 6 | 20 | 1 | 0 | 0 | 0 | 0 | 0 |
| 0 | 6 | 20 | 0 | 0 | 0 | 0 | 0 | 0 |

Since tremorine acts by virtue of its transformation to keto-tremorine, antagonists of it may act either at the level of the central receptors or by hindering its transformation to keto-tremorine. γ - (3,4,5-trimethoxybenzamido)-butyric acid has been found to be active as an antagonist of both keto tremorine and tremorine, thus indicating that it acts at the level of the central receptors.

EXAMPLE II

Six mice of either sex are used as controls. To each is administered keto-tremorine in an amount of 1 mg./kg. intraperitoneally. Each of the control specimens exhibits tremors, catatonia and vagal symptoms. In another group of six mice, 10 mg./kg. of the sodium salt of γ-(3,4,5-trimethoxybenzamido)-butyric acid is injected intravenously. One hour later, keto-tremorine in the amount of 1 mg./kg. is intraperitoneally injected into the mice. In five minutes, four mice exhibit no tremors and the remaining two exhibit tremors which are attenuated from the controls. The mice exhibit catatonia and vagal symptoms; however, these are attenuated in comparison to the controls.

EXAMPLE III

Tremorine, when administered to an animal, has the effect of lowering the animal's temperature. Four groups of six mice each are employed to determine the effect of tremorine and γ - (3,4,5 - trimethoxybenzamido) - butyric acid upon the rectal temperature of mice at a room temperature of 22±2° C. In a first group, a physiological solution is intraperitoneally injected. In a second group, tremorine in the amount of 20 mg./kg. is intraperitoneally administered to each mouse. In a third group, the sodium salt of γ - (3,4,5 - trimethoxybenzamido) - butyric acid in the amount of 10 mf./kg. is administered intraperitoneally into each mouse, and in a fourth group, the sodium salt of γ-(3,4,5 - trimethoxybenzamido)-butyric acid in the amount of 10 mg./kg. is administered intraperitoneally to each mouse, and one hour later, tremorine in the amount of 20 mg./kg. is administered intraperitoneally to each mouse. Table II summarizes the results.

The above experiments show that the active compounds of the method of the invention antagonized the central effect of the tremorine. Further, the amounts of γ-(3,4,5-trimethoxybenzamido)-butyric acid, about 5 to 200 mg./kg., which provide noticeable improved effects in anti-

TABLE II

| Group | Material administered | Rectal temperature of mouse at— | | | | | |
|---|---|---|---|---|---|---|---|
| | | −60 min. | 0 min. | +30 min. | +60 min. | +90 min. | +120 min. |
| I | Physiological solution (IP) | 36.4±0.16 | 36.4±0.16 | 36.5±0.19 | 36.3±0.20 | | 36.3±0.15 |
| II | Tremorine (20 mg./kg., IP) | 36.5±0.13 | 29.1±0.24 | 28.5±0.46 | 29.5±0.59 | | 30.0±0.64 |
| III | γ-(3,4,5-trimethoxybenzamido)-butyric acid (10 mg./kg., IP) | 36.2±0.16 | 35.6±0.17 | 35.3±0.20 | 35.4±0.15 | | 35.8±0.11 |
| IV | γ-(3,4,5-trimethoxybenzamido)-butyric acid plus tremorine (10 plus 20 mg./kg., IP) | 36.3±0.11 | 35.6±0.13 | 29.3±0.39 | 28.8±0.68 | 29.1±0.67 | 30.1±0.53 |

EXAMPLE IV

γ - (3,4,5 - trimethoxybenzamido) - butyric acid is also useful in the treatment of tremors, hypomotility, and vagal symptoms which are created by a prior administration of 20 mg./kg. of tremorine intraperitoneally in laboratory animals. To six mice is administered 20 mg./kg. of tremorine intraperitoneally, and after tremorine symptoms occur, the sodium salt of γ-(3,4,5-trimethoxybenzamido)-butyric acid is injected intraperitoneally in the amount of 10 mg./kg. into each mouse. Tremors cease in all six mice, hypomotility improves in each of the six mice, and vagal symptoms are attenuated in each of the six mice.

EXAMPLE V

The compound employed in the method of the present invention presents little, if any, toxicity risk. To groups consisting of six mice, each is administered intraperitoneally one of the following dosage amounts of the sodium salt of γ - (3,4,5 - trimethoxybenzamido) - butyric acid in mg./kg.: 50, 100, 200, 400, 800, and 1600. The mice are observed for 72 hours and in none of the tests do any deaths occur.

EXAMPLE VI

Subacute toxicity tests are conducted on two, 6-member groups of rats and two, 6-member groups of guinea pigs. To one group of each type of animal is administered 200 mg./kg. of the sodium salt of γ-(3,4,5-trimethoxybenzamido)-butyric acid intraperitoneally at the rate of one injection per day for 7 days. The remaining groups are subjected to a daily dose of 400 mg./kg. per day, intraperitoneally administered, for 7 days. The animals are observed during the treatment days and for seven days thereafter. No deaths are found to occur in any of the groups. Table III provides in tabular form the average body weight of the subjects before treatment and then after treatment.

TABLE III

| Group | Animal | Daily dose [1] (mg./kg.) IP | Average body weight of animal (grams) | |
|---|---|---|---|---|
| | | | Initial | Final |
| 1 | Rat | 200 | 199.3±2 | 209±1.7 |
| 2 | Rat | 400 | 199.6±2.4 | 209±1.9 |
| 3 | Guinea pig | 200 | 596.6±7.3 | 597.3±6.3 |
| 4 | do | 400 | 596.5±8.6 | 601.1±7.9 |

[1] Of γ-(3,4,5-trimethoxybenzamido)-butyric acid.

tremorine treatment, are well below the concentrations utilized in the toxicity tests.

EXAMPLE VII

In a clinical test, fifteen human patients suffering from various degrees of Parkinsonism are treated with γ-(3,4,5-trimethoxybenzamido)-butyric acid. Intravenous dosages are 200 mg./day of the sodium salt of γ-(3,4,5-trimethoxybenzamido)-butyric acid based on the weight of the free acid, and oral dosages are 400 mg./day of γ-(3,4,5-trimethoxybenzamido)-butyric acid. The active compound is administered to the patients for at least one month. Positive modifications of the extrapyramidal symptoms, particularly tremors, of the Parkinsonism are witnessed. Negative side effects due to the treatment are not observed.

It is claimed:

1. A method of treating Parkinsonism comprising administering to a living animal body afflicted with Parkinsonism an affective amount of γ-(3,4,5 - trimethoxybenzamido)-butyric acid, or pharmaceutically-acceptable salt thereof, or a mixture of the foregoing.

2. The method of claim 1 wherein the pharmaceutically-acceptable salt is selected from the group consisting of sodium, potassium, ammonium, magnesium and calcium salts.

3. The method of claim 1 wherein the amount of γ-(3,4,5 - trimethoxybenzamido) - butyric acid or salt thereof administered is in the range of about 1 to 500 mg./kg. per day.

4. A method of treating symptoms of disorders of the central nervous system of a living animal body which responds to anticholinergic agents comprising administering to the living animal body an effective amount of 3,4,5-trimethoxybenzamido - butyric acid or pharmaceutically-acceptable salt thereof, or a mixture of the foregoing.

References Cited

UNITED STATES PATENTS 3,692,827   9/1972   Garzia _____ 424—319

STANLEY J. FRIEDMAN, Primary Examiner